United States Patent [19]
Choi

[11] Patent Number: 5,132,949
[45] Date of Patent: Jul. 21, 1992

[54] RECORD MEDIUM SEARCHING APPARATUS FOR A RECORDING/REPRODUCING SYSTEM

[75] Inventor: Seung-lyul Choi, Kyunggi, Rep. of Korea

[73] Assignee: SamSung Electronics Co., Ltd., Suweon, Rep. of Korea

[21] Appl. No.: 642,873

[22] Filed: Jan. 18, 1991

[30] Foreign Application Priority Data

Apr. 30, 1990 [KR] Rep. of Korea .................. 90-6122

[51] Int. Cl.$^5$ .................... G11B 17/22; G11B 15/68
[52] U.S. Cl. ............................... 369/37; 369/32; 369/34; 369/36; 360/92
[58] Field of Search .................. 369/34, 35, 36, 37, 369/38, 39, 32; 360/92; 235/381, 383

[56] References Cited

U.S. PATENT DOCUMENTS

| | | | |
|---|---|---|---|
| 3,092,254 | 6/1963 | Germen | 369/37 |
| 3,484,055 | 12/1969 | Raine | 369/37 |
| 4,141,045 | 2/1979 | Sheehan | 360/92 |
| 4,594,700 | 6/1986 | Takahashi et al. | 369/39 |
| 4,610,008 | 9/1986 | Ishibashi et al. | 369/39 X |
| 4,647,989 | 3/1987 | Geddes | 235/381 |
| 4,791,626 | 12/1988 | Staar | 369/37 |
| 4,823,332 | 4/1989 | Koike | 369/37 X |
| 5,019,927 | 5/1991 | Simone | 360/92 |

Primary Examiner—John W. Shepperd
Assistant Examiner—Michael C. Kessell
Attorney, Agent, or Firm—Robert E. Bushnell

[57] ABSTRACT

A record medium searching apparatus for a recording/reproducing system.

The searching apparatus receives a plurality of record media having index information about the respective contents of recording, and drives the magazine by a magazine driver for sequentially aligning the record media with an index pickup. The index information read out by the index pickup is indicated through an output unit of a recording/reproducing system, so that a user recognizes the content. Additionally, the index pick-up head may also up-date the index information. After the required record medium is searched, the record mediums is mounted to a record/playback deck by a loading/unloading device, thereby performing the recording or the reproducing of signals. Therefore, the contents of a plurality of record media can be simultaneously searched.

20 Claims, 2 Drawing Sheets

RECORD MEDIUM SEARCHING APPARATUS FOR A RECORDING/REPRODUCING SYSTEM

FIELD OF THE INVENTION

The present invention relates to a record medium searching apparatus for a recording/reproducing system, and particularly to a record medium searching apparatus in which a required record medium can be recorded on, and a record medium selected from a plurality of record media received thereinto can be reproduced from.

BACKGROUND OF THE INVENTION

In a record medium for storing various kinds of data such as image or sound information, various record media have appeared before the public in recent years which include a compact disc, a floppy disc, a video laser disc, and an IC card in addition to a magnetic record medium such as a conventional magnetic tape. Meanwhile, it has been carried out to develop techniques by which information of high density can be stored on a record medium smaller in size, lighter in weight, and easier in access. Accordingly, a plurality of programs can be densely recorded on a record medium, the result is that a user has many difficulties for selecting a record medium which includes a recorded program at need.

In order to solve the above mentioned problems, the content of a recorded program is easily searched by forming a bar code indicating the content at a predetermined part of a record medium as disclosed in Japanese Utility Model Publication No. 1-13391, for example.

However, it is disadvantageous in that the user spends so much time on recognizing respective contents of the programs recorded on a plurality of record media in such a device, because each record medium needs to be seperately mounted on a reproducer for searching the contents of respective programs. In addition, the intended program in the record media can be accurately selected only when the user has advance knowledge of the contents recorded on each record medium. On the other hand, when a user intends to record broadcasting program or a self-made program on a record medium, the selection of the proper record medium brings out the similar inconvenience as described above.

SUMMARY OF THE INVENTION

Accordingly, it is an object of the present invention to provide a record medium searching apparatus for a reproducing system capable of performing quick and easy searching of a record medium on which a required program is recorded out of a plurality of record media.

It is another object of the present invention to provide a record medium searching apparatus for a recording system capable of performing quick and easy searching of a recording medium suitable for recording a program out of a plurality of record media.

To achieve these and other objects, a record medium searching apparatus for a recording/reproducing system comprising;

a magazine for receiving a plurality of recording media respectively having index informations about contents of said record medium;

an index pickup for reading out the index information of the record medium;

a loading/unloading device for loading and unloading the record medium to a record playback deck;

a magazine driver for driving the magazine to selectively align the record medium in the magazine with said index pickup or the loading/unloading device;

an index processor for processing the index information read out from the index pickup to feed an output unit; and a system controller for controlling at least the magazine driver and the loading/unloading device.

BRIEF DESCRIPTION OF THE DRAWINGS

Other objects and advantages of the present invention will become more apparent by the following description with reference to accompanying drawings, in which.

DETAILED DESCRIPTION OF THE INVENTION

Figure 1:
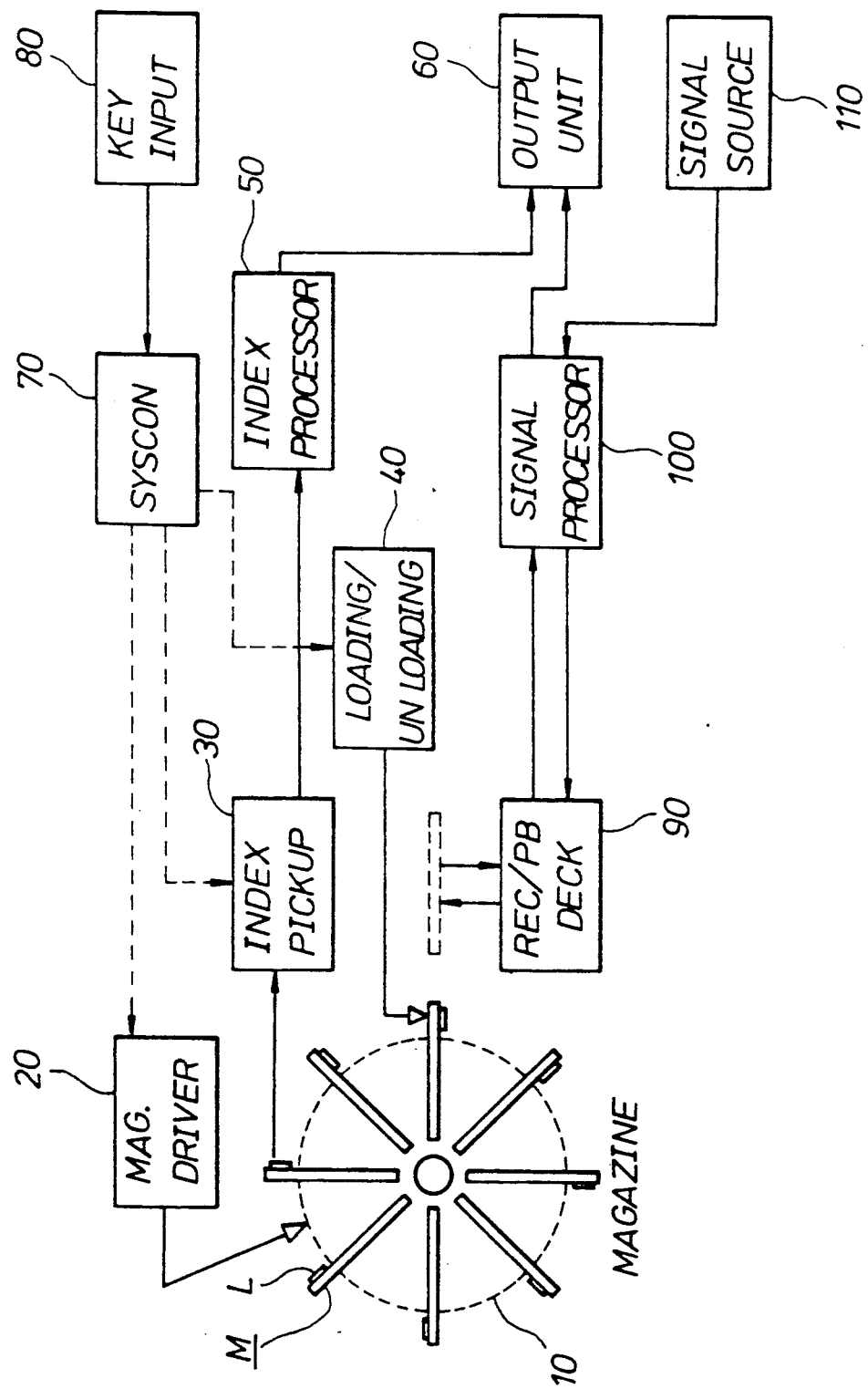
FIG. 1 is a block diagram showing a recording/reproducing system with a record medium searching apparatus according to the present invention.

As shown in FIG. 1, the recording/reproducing system with the record medium searching apparatus according to the present invention includes a magazine 10 retaining a plurality of record media M. The magazine 10 can be constructed as a rotary type used for a slide projector, a serial rack type, or a CD changer type, for example. Labels L on which index informations are recorded, to which further description will be made, are respectively attached or printed on each record medium M held in the magazine 10. And the record medium M held in the magazine 10 is formed to be selectively aligned with an index pickup 30 or a loading/unloading device 40 which will be described later, when the record medium M is positioned at a predetermined position of the magazine 10.

The magazine 10 is driven by a magazine driver 20 as much as a predetermined angle or as a predetermined distance at a time, so that a part of the record media M held in the magazine 10 are respectively and selectively aligned with the index pickup 30 and the loading/unloading device 40 as described above. The magazine driver 30 is preferably formed of a stepping motor, a DC motor, or, particularly a geared motor, for example.

The index information, which is recorded on the label L of the record medium M aligned with the index pickup, is read out by the index pickup 30, is then supplied to the index processor 50. The index information, in turn, is processed by the index processor 50 to be supplied to an output unit 60 which will be described later. The index pickup 30 is formed, e.g., of an optic or a magnetic pickup apparatus according to the type of the label L of the record medium M.

The loading/unloading device 40 is controlled by a system controller 70, to which further reference will be made, thereby mounting the record medium M aligned therewith to a record playback deck 90, or, on the contrary, making it return to the magazine 10. The loading/unloading device 40 includes, e.g., means for clamping or releasing the record medium and means for actuating the clamping means to move between the magazine 10 and the record/playback deck 90.

The record/playback deck 90 for recording or reproducing signals according to the mounting of the record medium M is connected to a signal processor 100 for processing the signals. And the signal processor 100 is connected to an output unit 60 during signal reproduction; and to a signal source 110 during signal recording. The aforesaid record/playback deck 90, the signal processor 100, the output unit 60, and the signal source 110 forms a conventional recording/reproducing system.

The output unit 60 can be, e.g., a monitor, a speaker, or a printer depending on the processed signal, and the signal source 110 is to be an audio turner, a video tuner, a video camera, or a computer, for example.

A system controller 70 is connected to the above parts for receiving various sensing informations to control them. The system controller 70 is connected to a key input device 80 such as a key board or a key pad for inputting a command from the user to control the apparatus.

A conventional slide feeding gear of a slide projector or a widely used CD changer can be utilized to the construction of the magazine, the magazine driver, and the loading/unloading device, which were not described in detail in the aforesaid construction.

The record medium searching apparatus according to the present invention is integrally formed with the recording/reproducing system in the foregoing description, it is also possible to be separately formed with each other.

Figure 2:
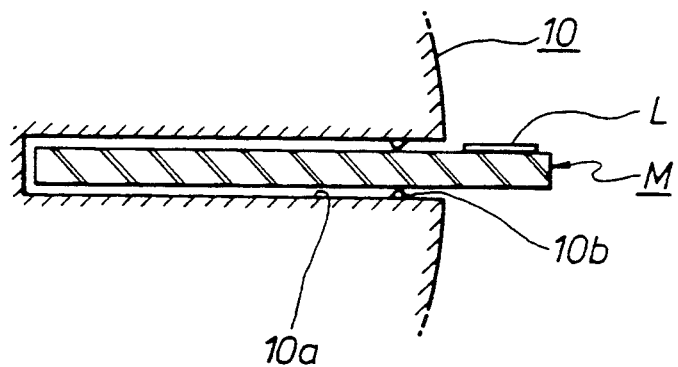
FIG. 2 is a partially enlarged schematic section view showing the state that a record medium is inserted into a magazine in FIG. 1.

In FIG. 2, the record medium M with the label L thereon is received into an accepting part 10a of the magazine 10. A holding piece 10b is installed in the accepting part 10a, thereby retaining the record medium M with a proper holding force. Here, if the record medium has an outer casing or the label L can be attached or printed thereon such as, e.g., a video tape cassette, an audio tape cassette, a digital audio tape cassette, a compact disc, a floppy disc, or a ram card, the searching apparatus can be formed for any type of the record media M. The constructions of the magazine 10 and the loading/unloading device 40 are changed depending upon the record medium M used.

Preferably, the label L is directly printed on the surface of the record medium M, or, alternatively, is attached thereon formed as a separate prints. Meanwhile, the information recorded on the label L is an index information for the content of the record medium M, which is recorded, e.g., by a bar code or a proper binary sign. The information is recorded, e.g., by optical or magnetic type, and, more preferably, the index pickup 40 is able to record, so that the label L can be changed by the user at need.

The operation of the record medium searching apparatus and the recording/reproducing system having the above mentioned structure according to the present invention will be described in detail with reference to FIG. 1.

When a user gives a command to start the searching through the key input device 80, the index pickup 30 is enabled by the system controller 70. Followed by this operation, the index information recorded on the label L of the arranged record medium M is read out by the index pickup 30, and is then supplied to the index processor 50. The index information is changed by the index processor 50 for being matched with the output unit 60, and is then supplied to the output unit 60, thereby being indicated to the user. For example, when the output unit 60 is a monitor, the index processor 50 is preferably provided with a character generator, so that the index information is indicated by the character on the monitor. When the output unit 60 is a speaker, it is also possible to output a sound by sound synthesizing.

After recognizing the index information indicated on the output unit 60, the user commands the next searching to the system controller 70 through the key input device 80, if the record medium M is not the required one. Thus, the magazine driver 20 is started by the system controller 70 for rotating, clockwise, the magazine 10, e.g., at a predetermined angle, which is of 45° in the drawing, the next record medium M is then aligned with the index pickup 30. The index information is outputted via the procedures as described above, and the user discriminates the required record medium M by repeating the similar processes.

When the required record medium M is found, the user commands the loading of the record medium M to the system controller 70 through the key input device 80. As the found record medium M is aligned with the image pickup 30, it should be displaced to be aligned with the loading/unloading device 40 for recording or reproducing. Therefore, the magazine driver 20 is started by the system controller 70 thereby making the magazine 10 be rotated in clockwise direction at 90° in the drawing. Then, the required record medium M is aligned with the loading/unloading device 40. and the loading/unloading device 40 is in turn started by the system controller 70, thereby mounting the record medium M to the recording/reproducing deck 90.

When a program is reproduced from the searched record medium M, the data of the record medium M is read out by the recording/reproducing deck 90, and is then supplied to the signal processor. Thus, the reproduced signal is properly processed to, e.g., an image siganl, a sound signal, or a character signal by the signal processor 100, and is then outputted through the output unit 60.

On the other hand, when a program is intended to be recorded on the searched record medium M, the siganl supplied from the signal source 110 is properly processed by the signal processor 100, is supplied to the recording/reproducing deck 90, and is recorded on the record medium M.

When the recording or the reproducing is completed, the loading/unloading device 40 is started by the system controller 70, so that the record medium M is demounted from the recording/reproducing deck 90 to be returned to the magazine 10.

Unlike the method that the user searches by confirming the index information of each record medium M through the output unit 60 as in the above mentioned description, the required record medium can be automatically searched. For example, when a searching information such as the name of the required record medium or the title of the program recorded thereon is inputted through the key input device 80, the searching information is temporarily stored in the system controller 70 which then makes the magazine driver 20 start, thereby reading out the label L of each record medium M received into the magazine 10. Then, the index information is sequentially compared with the temporarily stored searching information by the controller 70. In case that the picked up index information corresponds to the searching information, the magazine driver 20 and the loading/unloading device 40 are started by the system controller 70 for mounting the required record medium M to the recording/reproducing deck 90, so that the automatic searching is completed.

Figure 3:
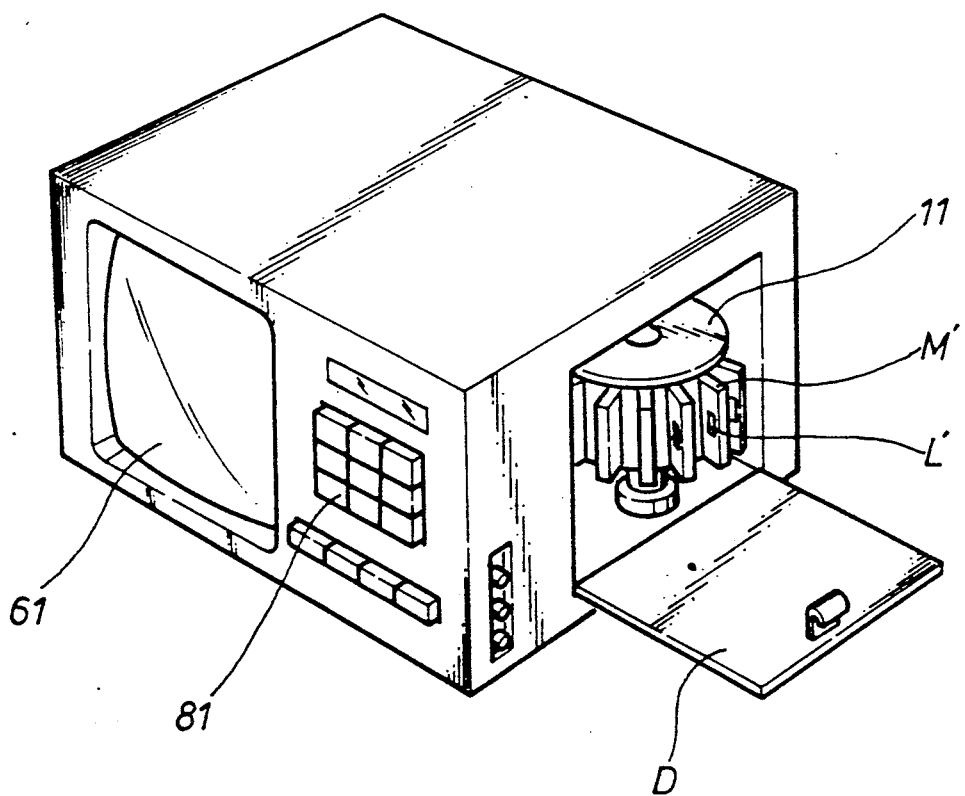
FIG. 3 is a perspective view showing a recording/reproducing system with the record medium searching apparatus according to the present invention.

In FIG. 3, a video recording/reproducing system with the record medium searching apparatus described as the above is illustrated. The numbers of each member are designated by respectively adding one to each number corresponding to each member utilized in the foregoing description.

The video recording/reproducing system is integrally provided with the record medium searching apparatus according to the present invention, wherein a plurality of video tapes M' respectively with labels L' retaining the index information are held in a magazine 11, a magazine driver and a loading/unloading device thereof are not shown in the drawing. The magazine 11 is contructed for receiving or drawing out the vide tape M', e.g., through door D formed in the side wall of the main body of the recording/reproducing apparatus.

When the user commands searching through a key input device 81, the index information of the label L' attached to the video tapes M' is indicated as a character information through a monitor 61, so that the user selects the required video tape M' by recognizing the information.

According to the present invention as described above, a required record medium or a program can be quickly and accurately searched by simultaneously performing the searching about a plurality of record medium. Therefore, it is possible to provide a recording-/reproducing apparatus suitable for a record medium on which a plurality of programs can be densely recorded.

What is claimed is:

1. A recording medium searching apparatus for a recording/reproducing system comprising:
    a magazine for receiving a plurality of recording media, each recording medium of said plurality of recording media respectively having an index location containing index information;
    a recording/reproducing deck for recording information on a selected one of said plurality of recording media and for reproducing information for replay from a selected one of said plurality of recording media;
    an index pickup for reading said index information from said index location and for recording said index information onto said recording medium at said index location, of selected ones of said recording media;
    a loading/unloading device for loading and unloading a selected one of said plurality of recording media to and from, respectfully, said recording/reproducing deck;
    a magazine driver for driving said magazine to selectively align one of said recording media in said magazine with said index pickup or said loading-/unloading device;
    an index processor for processing said index information read by said index pickup to provide processed index information to an output unit; and
    a system controller for controlling at least said magazine driver and said loading/unloading device.

2. An apparatus for searching a record medium, for use in a recording/reproducing system, comprising:
    a magazine for holding more than one said record medium, each said record medium having an index location located on said recording medium at the same location for providing index information;
    a magazine driver for driving said magazine to sequentially align each said record medium in said magazine with an index pickup means;
    a system controller for controlling said magazine driver;
    said index pickup means for reading said index information from said index location and for recording said index information at said index location, of each aligned record medium;
    a recording/reproducing deck for recording information on a selected record medium and for reproducing information for replay from a selected record medium;
    a loading/unloading device for loading and unloading said selected record medium to and from, respectfully, said recording/reproducing deck, said system controller controlling said loading/unloading device and said magazine driver for aligning said selected record medium with said loading/unloading device; and
    an index processor for processing said index information read by said index pickup to provide processed index information to an output unit.

3. The apparatus as claimed in claim 1, wherein said index information is contained in a label affixed onto said recording medium at said index location.

4. The apparatus as claimed in claim 1, wherein said recording medium comprises:
    a cassette and a magnetic tape in said cassette, wherein said index location is located on each said cassette at a predetermined location, wherein said predetermined location is the same on each said cassette.

5. The apparatus as claimed in claim 1, wherein said magazine rotates in response to said magazine driver.

6. The apparatus as claimed in claim 1, wherein:
    said output unit comprises a video monitor; and
    said recording information and said reproducing information respectively comprise recording video information and reproducing video information.

7. The apparatus as claimed in claim 1, wherein said output unit comprises a printer.

8. The apparatus as claimed in claim 1, wherein said output unit comprises a speaker.

9. The apparatus as claimed in claim 1, wherein said system controller temporarily stores data input thereto via a keyboard, said data corresponding to a desired index information on one of said recording media, wherein said system controller compares said index information, read by said index pickup, to said temporarily stored data for controlling said magazine driver and said loading/unloading device when said temporarily stored data and said index information correspond.

10. The apparatus as claimed in claim 2, wherein said index pickup means records index information onto said record medium at said index location.

11. The apparatus as claimed in claim 2, wherein said record medium comprises:
    a cassette and a magnetic tape in said cassette, wherein said index location is located at the same location on each said cassette.

12. The apparatus as claimed in claim 2, wherein said magazine rotates in response to said magazine driver.

13. The apparatus as claimed in claim 2, wherein:
    said output unit comprises a video monitor; and information recorded and reproduced by said recording/reproducing deck comprises video information.

14. The apparatus as claimed in claim 2, wherein said output unit comprises a printer.

15. The apparatus as claimed in claim 2, wherein said output unit comprises a speaker.

16. The apparatus as claimed in claim 2, further comprised of said system controller temporarily storing data input to said system controller via a keyboard, said data corresponding to a desired index information on one of said record medium, wherein said system controller compares said index information, read by said index pickup means, to said temporarily stored data for controlling said magazine driver and said loading/unloading device when said temporarily stored data and said index information correspond.

17. An appartus for searching a record medium, for use in a recording/reproducing system, comprising:
- a magazine for holding more than one said record medium, each said record medium having an index location on said recording medium the same location for each said record medium, said index location providing index information;
- a magazine driver for driving said magazine to sequentially align said index location on each said record medium in said magazine with an index pickup means;
- a system controller for controlling said magazine driver;
- said index pickup means for reading said index information from said record medium and for recording said index information on said record medium at said index location;
- a recording/reproducing deck for recording on a selected record medium and for reproducing information for relay from a selected record medium;
- a loading/unloading device for loading and unloading said selected record medium to and from, respectfully, said recording/reproducing deck, said system controller controlling said loading/unloading device and said magazine driver for aligning said selected record medium with said loading/unloading device; and
- an index processor for processing said index information read by said index pickup means to provide processed index information to an output unit.

18. The apparatus as claimed in claim 17, wherein said record medium is a compact disc.

19. The apparatus as claimed in claim 17, wherein said index information is magnetically recorded on said record medium at said index locations by said index pickup means.

20. The apparatus as claimed in claim 17, wherein said index pickup means optically reads said index information.

* * * * *

UNITED STATES PATENT AND TRADEMARK OFFICE
CERTIFICATE OF CORRECTION

PATENT NO. : 5,132,949
DATED : 21 July 1992
INVENTOR(S) : Seung-lyul CHOI

It is certified that error appears in the above-identified patent and that said Letters Patent is hereby corrected as shown below:

Column 8, claim 19, line 24, change "locations" to --location--.

Signed and Sealed this

First Day of February, 1994

*Attest:*

BRUCE LEHMAN

*Attesting Officer*  *Commissioner of Patents and Trademarks*